Patented Oct. 8, 1935

2,016,477

UNITED STATES PATENT OFFICE 2,016,477

COMPOSITION OF MATTER FOR AND METHOD OF TREATING IRON AND STEEL

Hannah G. Bassett, Oklahoma City, Okla.

No Drawing. Application April 20, 1933,
Serial No. 667,038

7 Claims. (Cl. 148—15)

The object of my invention is the production of a composition for, and a method of, strengthening, hardening and making more tenacious iron and steel; which will be new and useful; which may be applied in various ways; which may be applied in differing degrees of heat; which may be applied under varying conditions; which may be applied cold before the application of heat; which may be completely and successfully used and applied in from an eighth to a twelfth of the time now required for similar, though less desirable, results; which will make the metal treated therewith much stronger; which will make the metal treated therewith much harder; which will make the metal treated therewith much more tenacious; which is simple; which will be comparatively cheap in its use; which will be easily applied and used; and which will be efficient for all of the purposes for which it is intended.

The present methods of treating iron and steel require from eight to twelve hours for applying the treatment; my method under favorable circumstances can be completely applied in an hour, though to produce some results sought a longer time is required; the use of the present methods only affect the outer part of the metal where the metal treated is of any considerable size, or body; my method can be applied so as to effect the whole body of the metal throughout, and even when it is not desired to have the metal treated of uniform strength and hardness throughout and my method and composition is only partially applied, my method and composition effects the metal more or less throughout the whole structure.

My composition consists, preferably, first, of a preparation of pulverized soy beans, or a soy bean meal prepared as more fully hereinafter described, constituting approximately 90% of the whole composition; a second compound, which on account of the elusive nature of some of the ingredients thereof, I prefer to have made up for use separately from time to time, the ingredients and approximate proportions with relation to each other of which are as follows: sodium-cyanide 75%, sodium-chloride 20% and sodium-carbonate 5%; from this second compound I preferably use in the whole composition a sufficient amount to constitute 4% of the whole composition; ammonium-chloride 4%; barium-carbonate 1%; and potassium bi-chromate 1%.

The proportions of all of the above ingredients above mentioned with relation to the whole composition would be approximately as follows:

| | Percent |
|---|---|
| Pulverized soy beans | 90 |
| Sodium-cyanide | 3 |
| Sodium-chloride | ⅘ |
| Sodium-carbonate | ⅕ |
| Ammonium-chloride | 4 |
| Barium-carbonate | 1 |
| Potassium bi-chromate | 1 |

I find that in the preparation of the soy bean meal for use in the final composition it is better to roast the meal as it relieves it of the excessive amount of oil, present in the soy bean, and the results thereby produced are better. However, as indicated hereinbefore the use of the pulverized soy beans with the other ingredients will produce excellent results.

It is hard to inoculate iron and steel with nitrogen. The difficulty seems to be in getting them so combined as to form an even pattern throughout the whole structure. When nitrogen in an inorganic form is combined with iron or steel the result produced is generally in globules, causing a very uneven pattern, which tends to weaken the metal in some places.

It is well known that all leguminous plants produce fruit bearing a very large percentage of nitrogen. The soy bean is of that family and is particularly rich in nitrogen content, and it is peculiarly useful for my purpose, and especially is this true when finely pulverized. The form of nitrogen furnished in the organic form of soy beans, and especially in the small pulverized particles thereof, makes a basis for the easy taking up of the small particles, or amount, of nitrogen, by the iron and steel.

It has been found in various parts of the country the content of the soy bean varies somewhat probably owing to the difference in the soil in which it grows and possibly owing to the amount of moisture taken from the air in the producing of the product.

Some other nitrogen-carrying forms of organic materials, such as cow-peas, and other leguminous plant products, may be used, and I therefore claim as my own, all such materials for use in my composition with or without the other ingredients herein mentioned, and the pulverized products thereof.

I find in the organic form, pulverized, as indicated the elements therefrom including nitrogen are more readily absorbed by the iron and steel, and the nitrogen is more evenly distributed throughout the product in the form of very fine nitrogen needles, and that even this is accentuated by the previously mentioned roasting of the pulverized ingredient.

I cannot state the exact efficacy of all of the ingredients. However, among other things, I think the various ingredients act approximately as follows: the pulverized leguminous products, especially of soy beans, largely furnishes the evenly distributed nitrogen content in such form as to be readily taken up and absorbed by the iron and steel, it assists in relieving the metal of impurities, and strengthens, hardens and makes more tenacious the metals; the sodium-cyanide acts as a carbonizer, and assists the iron and steel to be more readily relieved of carbon, sulphur, arsenic, phosphorus, and the like, but permits some carbon of a peculiar form to remain for combining and uniting with the nitrogen from the soy bean content producing a very fine effect, it also acts as a reducing agent; the sodium-chloride is principally a cleanser, removing carbon, sulphur and other impurities from the iron and steel, and assists in bleaching the organic substances, and assists in drawing the nitrogen from the elements containing it. It is also a de-oxidizer and also acts as a catalytic agent, bringing about a more radical chemical re-action; the sodium-carbonate produces carbon-dioxide which facilitates the drawing of the carbon from the metal, and extracting the nitrogen from the nitrogen-containing elements; the ammonium-chloride under the heat and pressure under which my composition is used produces moisture, or water, and nitrogen, assists in ridding the metal of carbon therein and assists in making the mass more soluble, and assists in forming a direct union of the elements of the composition, and assists in bleaching the organic substances used; the barium-carbonate assists in separating the sulphur and other impurities of the metal from the metal; assists in making the metal more tenacious, and unites and binds the molecules thereof in closer union; and the potassium bi-chromate also acts as an oxidizing agent, assists in making the metals harder and more tenacious, and assists in separating the oxygen from the metal and therefore in better preparing it for the action of the other ingredients thereon.

It seems to be impossible to determine the exact molecular action which takes place. The application of the combined whole tends to very materially lower the critical heat point in the metal.

I am not sure whether my composition as applied for the results sought simply acts to bring about a more perfect union of the various ingredients, or elements, or produces a different chemical by the union of all of them, thereby forming a different chemical compound, but judging from the marked effect produced over that which has been heretofore accomplished, I am rather inclined to believe the latter is the case.

My composition is to be applied to the metal having various degrees of hardness and softness, and may be applied cold and then heated, or with heat in various degrees and under various conditions owing to the results desired to be produced. It seems that the thicker the body of metal treated the greater is the difference between the result produced by my invention and that heretofore accomplished by other methods.

One of the best ways of applying or using my composition for the treatment of the metal is to place the metal to be treated in a crucible and surround the metal entirely with the composition, then heat the whole in a furnace as desired. Another way is to prepare the composition and then place it in proper proportion with the metal to be treated, according to the results desired to be produced in a receptacle with the metal and then heat the whole mass for a desired length of time to produce the result sought. This furnishes an entirely even mixture throughout the body of the metal so treated, and in whatsoever form in which the metal is used makes the metal of uniform strength, hardness and tenacity. It may also be applied dry when desired, or the metal may be heated and then plunged into the dry composition, or it may be sprinkled on or spread on, so that a sufficient quantity of the composition will adhere to the metal, and then heating the metal as desired. Or the composition may be made up with an adhesive binder such as cold water or the like, and then heated. I do not wish to bind myself to any particular manner of applying the composition, however.

It is understood that various changes may be made in the proportions of the mixtures and the ingredients, or ingredients containing substantially the same elements within the scope of my invention without departing from the spirit or broad principle of my invention, and without sacrificing any of the advantages thereof.

Having described my invention what is claimed and desired to be secured by Letters Patent, is:

1. A composition of matter for strengthening, hardening and making more tenacious iron and steel, embodying pulverized soy beans constituting approximately 90 percent of the whole, and sodium-cyanide, sodium-chloride, sodium-carbonate, ammonium-chloride, barium-carbonate and potassium bi-chromate, the last six named elements constituting approximately 10 percent of the whole.

2. A composition of matter for uses substantially as described, containing the following ingredients in approximately the following proportions: pulverized soy beans 90%, sodium-cyanide 3%, sodium-chloride ⅘%, sodium-carbonate ⅕%, ammonium-chloride 4%, barium-carbonate 1% and potassium bi-chromate 1%.

3. The method of treating iron and steel consisting of placing the metal surrounded by composition consisting of pulverized soy beans 90%, sodium-cyanide 3%, sodium-chloride ⅘%, sodium-carbonate ⅕%, ammonium-chloride 4%, barium-carbonate 1% and potassium bi-chromate 1% in a crucible, and then heating the whole.

4. The method of treating iron and steel consisting of heating the metal, and then exposing the heated metal to a composition containing pulverized soy beans, sodium-cyanide, sodium-chloride, sodium-carbonate, ammonium-chloride, barium-carbonate and potassium bi-chromate, of which composition the pulverized soy beans comprises approximately 90 per cent of the whole.

5. The method of treating iron and steel consisting of heating the metal, then treating the heated metal to a composition containing pulverized soy beans 90%, sodium-cyanide 3%, sodium-chloride ⅘%, sodium-carbonate ⅕%, ammonium-chloride 4%, barium-carbonate 1% and potassium bi-chromate 1%, and then heating the metal so treated, and then cooling the metal.

6. A composition of matter for uses substantially as described, containing the following ingredients in approximately the following proportions: the pulverized product of soy beans constituting 90 per cent of the whole, said product containing not less than 26 per cent nitrogen free extract and not less than 43 per cent protein, sodium-cyanide 3 per cent, sodium-chloride ⅘ per cent, sodium-carbonate ⅕ per cent, ammonium-chloride 4 per cent, barium-carbonate 1 per cent, and potassium bi-chromate 1 per cent.

7. A composition of matter for uses substantially as described, containing the following ingredients in approximately the following proportions: the pulverized product of soy beans constituting 90 percent of the whole, said product containing not less than 26 percent nitrogen free extract and not less than 43 percent protein, sodium-cyanide, sodium-chloride, sodium-carbonate, ammonium-chloride, barium-carbonate and potassium bi-chromate, the last six named elements constituting approximately 10 percent of the whole.

HANNAH G. BASSETT.